March 24, 1970   M. A. CROUCH ET AL   3,502,948
DUAL O-RING SEAL FOR CAPACITORS
Filed Dec. 4, 1967
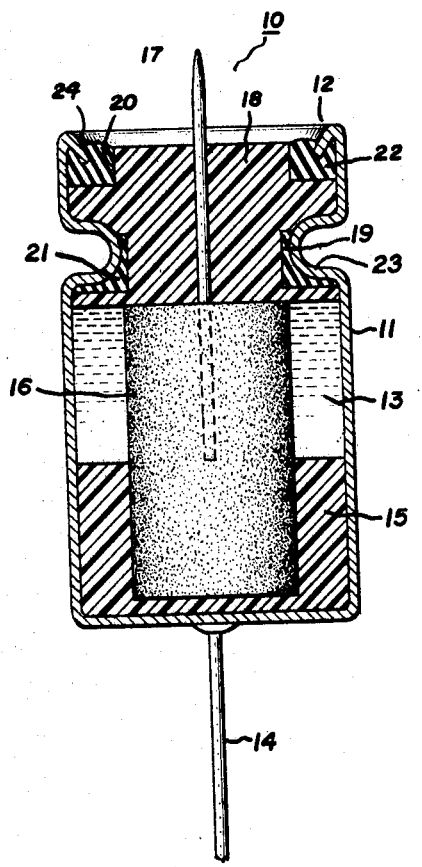
INVENTORS:
MARVIN A. CROUCH,
CHARLIE E. TAYLOR,
BY *James J. Lichiello*
THEIR ATTORNEY.

{ # United States Patent Office 3,502,948
Patented Mar. 24, 1970

3,502,948
DUAL O-RING SEAL FOR CAPACITORS
Marvin A. Crouch, Columbia, and Charlie E. Taylor, Gilbert, S.C., assignors to General Electric Company, a corporation of New York
Filed Dec. 4, 1967, Ser. No. 687,625
Int. Cl. H01g 9/00, 1/02
U.S. Cl. 317—230                    9 Claims

ABSTRACT OF THE DISCLOSURE

A plug type electrolytic capacitor seal having a pair of axially spaced concentric O-ring seals on a common plug and compressed by a common wall is disclosed.

---

This invention relates to capacitor end seals and more particularly to a dual end seal for electrolytic capacitors containing liquid, semi-solid, or other wet electrolytes.

A common cause of failure of electrolytic capacitors is the loss of electrolyte through inadequate seals between, for example, an anode lead and the end cap or plug, or between the plug and the capacitor housing. The loss of corrosive electrolyte or its vapors lead to degradation of the electrical properties of the capacitor as well as premature electrical breakdown. An adequate seal for electrolytic capacitors must prevent the escape of electrolyte liquid or vapor through a wide temperature range while at the same time being capable of withstanding high internal built-up pressures within the capacitor. The seal must additionally be compatible not only with the metals utilized in the capacitor, but also with the electrolyte, so that corrosion of the seals as well as the electrical leads is minimized.

Accordingly, it is an object of this invention to provide an improved electrolytic capacitor seal structure.

It is a further object of this invention to provide a dual form of seal for an electrolytic capacitor end seal.

It is yet another object of this invention to provide a dual O-ring seal for electrolytic capacitors.

It is a still further obect of this invention to provide an improved electrolytic capacitor end seal incorporating two O-rings on a common plug member for dual sealing purposes.

In one form of this invention, an electrolytic capacitor having a tubular metallic casing is provided with a plastic material end plug in one end thereof. The end plug is provided with a peripheral groove centrally located therealong in which there is positioned a first thin O-ring of a rubbery easily compressible material. At the open end of the casing the plug is provided with a further annular or rim groove in which there is positioned a second O-ring. Peripheral local indentation of the case opposite the first O-ring provides a seal between the casing wall and the first O-ring. Rolling or crimping of the end of the tubular casing provides an in-turned lip which engages the second O-ring for compression thereof to provide a secondary seal for the capacitor.

In one preferred embodiment of this invention, the plug material is of a polytetrafluoroethylene material, i.e., Teflon, and the O-rings are of ethylene propylene rubber material (EPR) for said first O-ring and trifluorochloroethylene vinylidene chloride copolymer (Kel-F elastomer) material for said second O-ring. This combination is effective particularly in acid electrolyte capacitors which must operate through a wide temperature range. It has been found the ethylene propylene rubber is a superior material for use in seals which must function at very low temperatures. In capacitors which must operate at temperatures approaching —55° C., elastomers such as Kel-F or Viton become quite hard and brittle, and separation of the case and O-ring may occur with consequent electrolyte leakage. Under these conditions of extreme low temperature, the ethylene propylene material remains sufficiently resilient to provide a good seal. The Kel-F elastomer is advantageous as the second O-ring seal since it has excellent resistance to a variety of contaminants. This embodiment of this invention is particularly effective where such environmental requirements as high altitude (low temperature plus vacuum) and extreme cold storage are applicable. However, for a number of other environments, the material choice may include combinations of two Kel-F O-rings, two EPR O-rings or other elastomers. A further description of sealing materials and seal problems is found in U.S. Patent 3,114,085—Ruscetta, assigned to the same assignee as the present invention.

This invention will be better understood when taken in connection with the following description and the accompanying drawing in which:

FIGURE 1 is a cross-sectional view of a capacitor involving the improved dual seal means of this invention.

Referring now to FIGURE 1, there is illustrated an electrolytic capacitor 10 incorporating the dual seal configuration of this invention. Capacitor 10 includes a tubular or cup-shaped casing member 11 which is generally of a metal and utilized as the cathode of the capacitor. More particularly, casing 11 must be of a metal which is inert with respect to the electrolyte being employed in the capacitor. Casing 11, accordingly, may be of a noble metal, for example, silver, particularly in tantalum capacitors where the electrolyte contains an acid such as sulfuric acid. Casing 11 in one form of this invention is a single ended casing with an open end 12 and containing an acid electrolyte 13. A lead 14 is connected to the closed end of casing 11 to serve as the cathode connection.

There is inserted through open end 12 of casing 11 an electrically insulating spacer and support member 15 to rest in nesting relationship adjacent the closed end of casing 11. Support member 15 is also of a material which is compatible with respect to the acid electrolyte, a Teflon material being employed with good results, and is cup-shaped to receive anode 16 therein.

The support member 15 provides shock-resistant and insulating support means for anode 13 in the central position as indicated in the drawing. Anode 16 in one form of this invention is a porous sintered tantalum structure including a lead 17 extending therein and projecting outwardly of the open end 12 of the casing 11. In order to fixedly position the anode 16 within casing 11 and to seal casing 11 a combined plug seal 18 is utilized in the open end 12. Anode lead 17 projects through plug 18 so that anode 16 is fixedly positioned in casing 11. Plug seal 18 is a non-conducting material also compatible with the electrolyte, and further compatible with the metal of the case 11 for seal purposes. The material for plug member 18 is usually a thermoplastic material, with polytetrafluoroethylene (Teflon) providing a number of advantages for its use. Among these advantages are compatibility with acid electrolytes, compatibility with metals such as silver in casing 11, good temperature and structural stability over wide operating range of the capacitor, and workability for sealing purposes. However, even with these known advantages, Teflon material alone has not been found to provide a satisfactory seal because of some noted disadvantages, particularly, adverse cold flow properties, different temperature coefficients of expansion between Teflon material and silver, and a necessity for extreme working of metal cases in order to provide a seal between the metal and Teflon material. Accordingly, a Teflon material plug type seal, while satisfactory for many applications, is limited at the extreme ends of temperature ranges and under cycling temperature conditions.

It has been discovered that the use of separate O-ring
} seals, in combination with a Teflon material plug 18, provides for satisfactory operation of a Teflon plug sealed capacitor over extended operating ranges between about −55° C. to about 125° C. For example, this invention includes a pair of O-rings which are concentric with the longitudinal axis of the capacitor 10 and are axially spaced apart along the length of plug 18. More particularly, for example, Teflon plug 18 includes a pair of preformed grooves 19 and 20 therein. Groove 19 is generally centrally located with respect to plug 18, or at least having the bottom and both side walls defined by the plug. In this groove 19 there is positioned a first O-ring 21 made of a material compatible with the electrolyte and silver, as previously described with respect to the plug 18 and support 15 materials. O-ring 21 may include Kel-F material, ethylene propylene rubber and other suitable O-ring gasket materials.

The upper surface of plug 18 includes a peripheral annular cutout or shoulder type of groove 20 in which there is positioned a second O-ring 22 of a material similar to that of O-ring 21. In assembly of the capacitor 10, plug 18 is inserted within casing 11 with the noted O-rings 21 and 22 in the positions as illustrated. Thereafter casing 11 is rolled to provide the indentation or peripherial casing groove 23 which engages and compresses O-ring 19 to provide a seal between the O-ring and the casing and between the O-ring and plug 18. Thereafter the open end of the casing 11 is rolled over or crimped so that an in-turned lip portion thereof engages the upper O-ring 22 for compression and sealing between the casing and the O-ring and between the O-ring and the plug 18. Accordingly, the O-rings 21 and 22 provide separate seals but are retained within the same plug 18, and are cooperative with the same coextensive casing wall. Because of this sharing of the same plug and the same wall the two seals are cooperatively related to distribute sealing adversities therebetween. The foregoing advantages are associated with a dual O-ring seal as differentiated from a pair of different kinds of seal elements, or dual plugs and dual casings as disclosed in U.S. Patent 2,224,307. The dual seal as described has been found to meet rigid requirements connected with, for example, tantalum capacitor utilizing an electrolyte of sulfuric acid. Seals of this invention have been found to be operative throughout an operating temperature range from about −55° C. to about 125° C. Operation of the seals of this invention in the noted temperature range indicated the effectiveness of the seals in remaining resistant to the electrolyte while providing an excellent seal and vapor barrier for the electrolyte.

Representative samples have been made of sulfuric acid containing capacitors involving the seal as disclosed in this invention. These seals were tested under the conditions as given in the following Table I.

TABLE I

|  | T1 Case 25 v. 10 uf. | | T2 Case 50 v. 40 uf. | | T3 Case 60 v. 68 uf. | |
| --- | --- | --- | --- | --- | --- | --- |
|  | Tested | Failed | Tested | Failed | Tested | Failed |
| Altitude (4 cycles, 75,000 feet, −55° C.) | 41 | 0 | 41 | 0 | 41 | 0 |
| Cold storage (−62° C. for 48 hours) | 41 | 0 | 41 | 0 | 41 | 0 |
| Temperature cycle (5 cycles of +125° C. to −55° C.) | 41 | 0 | 41 | 0 | 41 | 0 |
| Life test (85° C. for 2,000 hours) | 15 | 0 | 13 | 0 | 13 | 0 |
| Life test (125° C. for 2,000 hours) | 14 | 0 | 19 | 0 | 19 | 0 |
| Life test (150° C. for 2,000 hours) | 12 | 0 | 10 | 0 | 9 | 0 |

The above data summary illustrates the excellent performance of the seal of this invention through a stringent environmental test sequence followed by life test on all samples.

The dual or double seal of this invention is an improvement in seal integrity over a single seal by requiring a greater pressure to cause leaking at the second seal, i.e., the upper seal, since the possible leak area is greatly reduced over that for the inner or lower seal. This arrangement of reducing the leak area by the addition of a second seal provides a much greater insurance of a leak-tight closure. The O-rings are separate parts of the assembly and their properties and dimensions are fixed and easily controlled. Since an O-ring is controlled dimensionally, a constant seal is assured about the capacitor body and the seal is not dependent upon variables associated with the application of, for example, fluids or semi-solid sealing materials between the casing 11 and a plug 18. In addition the elastomer O-ring seal 21 is not susceptible to exposure to air etc., and provides a seal throughout a wide temperature range because of its inherent elasticity and compression set properties. The use of an O-ring at the top of plug 18 has the advantage of permitting the use of a thinner cross-section of material as compared with a solid wafer or gasket. Thin sections of a solid gasket or washer tend to bulge in the center when the lip of a casing is rolled over. The O-ring eliminates this problem and permits more space in the capacitor for anode and electrolyte thereby increasing the capacitance and improving the life expectancy of the capacitor.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What we claim as new and desire to secure by Letters Patent of the United States is:

1. An electrolytic capacitor end seal element consisting essentially of:
   (a) an electrically insulating plug member adapted to engagingly fit in the end of a tubular casing;
   (b) said plug member having a first peripheral groove intermediate its ends and a second peripheral shoulder groove in an end surface thereof and;
   (c) an elastomer O-ring seal in each of said grooves;
   (d) the O-ring in said first groove being ethylene propylene rubber.

2. A capacitor end seal comprising in combination:
   (a) a casing having an open end;
   (b) a plug member in the open end of said casing;
   (c) the said plug member having concentric and axially spaced grooves therein;
   (d) a resilient O-ring gasket in each of said grooves;
   (e) an intermediate portion of said casing being peripherally indented into one of said grooves to compress the O-ring therein to provide a first seal between the O-ring and the casing and between the plug and the O-ring;
   (f) an end portion of said casing being peripherally inwardly deformed into the other of said groove to compress the O-ring therein to provide a second seal between the said O-ring and the casing and between the plug and the O-ring;
   (g) the said casing and the said plug being coextensive and continuous between said O-rings.

3. The invention as recited in claim 2 wherein at least said first seal O-ring is of ethylene propylene rubber.

4. An electrolytic capacitor end seal comprising in combination:
 (a) a tubular casing containing an acid electrolyte and an anode in contact with said electrolyte;
 (b) a fluorinated polyethylene plug member in one end of said casing to seal the electrolyte therein;
 (c) said plug member having a first peripheral pre-cut groove therein intermediate its ends;
 (d) a first elastomer O-ring in said groove;
 (e) said plug member having a pre-cut second peripheral shoulder groove in its outer end surface;
 (f) a second elastomer O-ring in said shoulder groove;
 (g) said casing and plug being coextensive between said grooves;
 (h) a peripherally indented portion of said casing projecting into said first groove to compress the first O-ring therein for sealing purposes and;
 (i) a peripheral end portion of said casing defining an inturned lip compressionally engaging said second O-ring for sealing purposes.

5. The invention as recited in claim 4 wherein said plug is a polytetrafluoroethylene material and said O-rings are elastomer material.

6. The invention as recited in claim 5 wherein at least the second said O-ring is trifluorochloroethylene vinylidene chloride copolymer material.

7. The invention as recited in claim 5 wherein at least the first said O-ring is ethylene propylene rubber.

8. The invention as recited in claim 5 wherein said acid is sulfuric acid.

9. The invention as recited in claim 5 wherein said casing contains silver and said anode is tantalum.

References Cited

UNITED STATES PATENTS

| | | | |
|---|---|---|---|
| 3,174,085 | 3/1965 | Schroeder et al. | 317—230 |
| 3,243,316 | 3/1966 | O'Nan et al. | 317—230 |
| 3,341,751 | 9/1967 | Clement | 317—230 |

JAMES D. KALLAM, Primary Examiner

U.S. Cl. X.R.

174—52